United States Patent Office 2,785,377
Patented Mar. 12, 1957

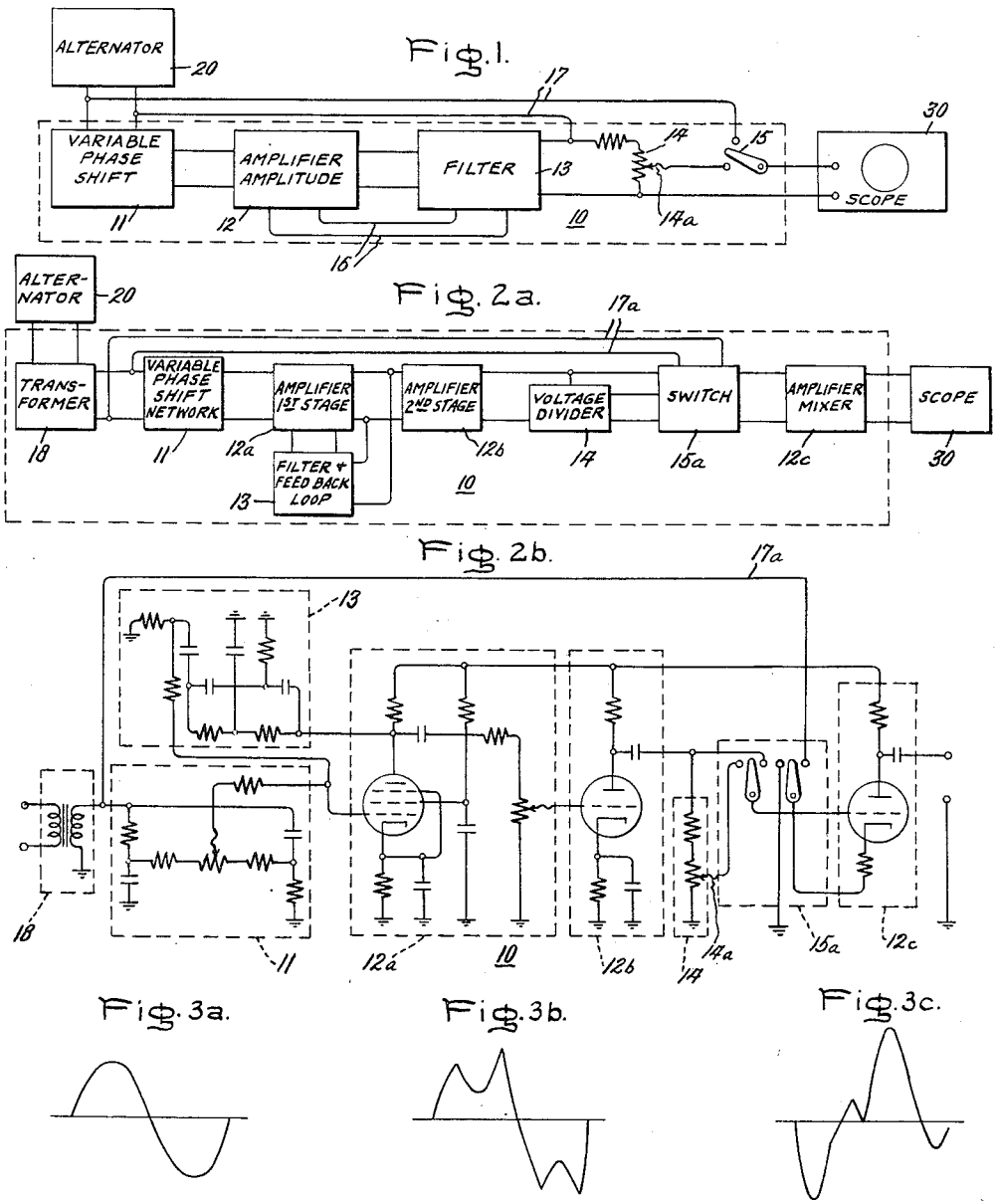

2,785,377

DEVIATION FACTOR METER

Fred O. MacFee, Jr., Saugus, and Lawrence R. Yorgy, Beverly, Mass., assignors to General Electric Company, a New York corporation Application August 27, 1953, Serial No. 376,939

4 Claims. (Cl. 324—77)

This invention relates generally to testing apparatus and specifically to electronic equipment for determining the deviation factor of alternating current waveforms directly.

The deviation factor of a wave is the ratio of the maximum difference between corresponding ordinates of the wave and an equivalent sine wave to the maximum ordinate of the equivalent sine wave when the waves are superposed in such a way as to make the maximum difference as small as possible.

In a commonly used method of finding the deviation factor of an alternator, physical measurements of at least 24 or more ordinates of an oscillogram of the alternator waveform are made. From these measurements, the root-mean-square value of the wave is determined, and an equivalent sine wave created. Ordinates of the equivalent sine wave are calculated for the same number of points as measured from the original wave, and the two waves then, in effect, shifted in phase with respect to one another until the maximum difference in ordinates becomes a minimum. The maximum difference in ordinates for this minimum condition is then compared to the peak ordinate of the equivalent sine wave, and the resulting ratio, expressed as a percentage, gives the deviation factor of the original wave.

The above-described method of obtaining deviation factors requires a considerable expenditure of manhours. Since the harmonic content of alternators is found generally through the use of a wave analyser, the analysis of oscillograms is required usually only for deviation factor determination. With the use of electronic equipment which we call our deviation factor meter, no oscillogram analysis is necessary, so that a direct labor saving of almost all the man-hours expended previously in such determination becomes possible.

It is, therefore, an object of the present invention to provide an improved electronic apparatus for testing alternators.

It is another object of invention to provide an improved electronic instrument for determining the deviation factor of alternator waveforms.

Still another object of invention is to provide a combination of electronic equipment for the direct determination of the deviation factor of alternating current waveforms.

These and other objects, features and advantages of our invention will become more apparent from the following particular description, and from an inspection of the accompanying drawings in which:

Fig. 1 is a block diagram of one form of a deviation factor meter;

Fig. 2a is a block diagram of a modified version of the deviation factor meter disclosed in Fig. 1;

Fig. 2b is a circuit diagram of the modified version of the deviation factor meter disclosed in Fig. 2a; and Figs. 3a to 3e inclusive are the successive views of the waveforms obtained when determining the deviation factor with our deviation factor meter.

In carrying out the objects of our invention, we have constructed an instrument which operates on the output signal from an alternator, to separate the harmonics from the signal and then compares the amplitude of these harmonics to the amplitude of the fundamental frequency component of the signal, the ratio being the actual deviation factor of the output signal of the alternator, which is indicated directly.

Referring to Fig. 1 of the drawing, our deviation factor meter is shown generally at 10 comprising a phase shift network at 11, an amplifier at 12, a filter at 13, a voltage divider at 14 and a double throw switch at 15.

The source of alternator voltage to be examined is indicated at 20 and the output of the meter can be shown on oscilloscope 30.

A feed-back loop between filter 13 and amplifier 12 is indicated at 16 and a "bucking" voltage loop between the source of alternator voltage and the output voltage at the filter is shown at 17.

In operation, the phase shift network 11 enables the phase of the voltage fed into the amplifier 12 to be changed with respect to the phase of the input voltage, while the amplifier 12 controls the voltage amplitude. The voltage is then fed to a twin-T filter 13 which has a feed-back loop 16 to the amplifier 12. Filter 13 completely rejects from the feed-back loop 16 the fundamental frequency component of the input signal to the deviation meter 10, but passes all the harmonics present in the input signal into feed-back loop 16 in an out-of-phase relationship with respect to the input signal so as to cancel themselves out. The output of the instrument after the filter 13, therefore, contains only the fundamental frequency component of the input voltage, and this is then "bucked" against the original input voltage carried by loop 17, i. e., this component is removed from the original input voltage by mixing it out of phase, when the switch 15 is in the vertical position. The final instrument output is then impressed upon the cathode ray oscilloscope 30, and a minimum amplitude found by adjustment of the phase and amplitude controls 11 and 12, respectively. This minimum amplitude always occurs when the fundamental components of the filtered and unfiltered signals are exactly equal in amplitude and 180° out of phase. After finding this minimum amplitude, the switch 15 is thrown to the horizontal position so that an adjustable portion of the instrument sine wave output from voltage divider 14 is impressed upon the oscilloscope 30. This voltage is adjusted to give the same amplitude as the minimum difference voltage. The alternator deviation factor is then read directly from a dial calibrated to indicate the adjusted position of the wiper 14a of voltage divider 14.

In the modification shown in Figs. 2a and 2b, a transformer 18 has been inserted into the instrument 10 ahead of the phase shift network 11, the amplifier broken down into two stages, 12a and 12b, and an amplifier mixer 12c, the latter inserted between the switch 15a and the scope 30.

In Fig. 2b, the electrical hook-up corresponding to the block diagram of Fig. 2a is disclosed, with the respective parts of the circuit bearing the corresponding numbers used in Fig. 1, in order to show the specific manner in which the apparatus works.

In operation, the alternator voltage from alternator 20 is connected through the input terminals of the instrument 10 to a linear transformer 18 where the voltage amplitude is reduced. The reduced voltage signal then follows two paths, one going to the switch 15 through loop 17a as the original input signal, and the other being modified for purposes hereinafter more fully described by going to the resistance-capacitance phase shift network 11. The output of the phase shift network 11 is fed into a first stage amplifier 12a having a circuit with a feed-back twin-T filter 13 of the null type, which rejects only the fundamental frequency component of the input signal from the feed-back loop 16 but passes all the harmonics present in the input signal to the feed-back loop 16 in an out-of-phase relationship so as to cancel themselves out. Thus all harmonics present in the input signal to the filter 13 are fed back out of phase so as to cancel themselves, leaving only the fundamental frequency component as the output of the first stage amplifier 12a. The signal is then fed into the second stage amplifier 12b, to control the amplitude of the fundamental frequency component with the output of this stage going to the voltage divider resistance network 14 and directly to the double pole-double throw (DPDT) switch 15a.

When the switch 15a is in the right or balance position, the total signal output from the second stage amplifier 12b is "bucked" against the original input signal from loop 17a in the amplifier mixer 12c, where the original input waveform and fundamental frequency component are mixed out of phase with each other, i. e., the latter is subtracted from the former, and the output wave observed upon the cathode-ray oscilloscope 30. The phase and amplitude controls are adjusted until the minimum peak-to-peak voltage is observed, at which point balance is obtained. The vertical amplitude of this peak-to-peak voltage is noted and the DPDT switch 15 changed from balance to percent deviation factor measurement position, viz., the left position.

In this left position a selected portion of the fundamental frequency component on the voltage divider 14 is impressed upon the amplifier mixer 12c, and the output impressed upon the oscilloscope 30. By changing the proportion of the output signal impressed on the amplifier mixer 12c, the vertical amplitude observed on the oscilloscope 30 is made equal to the amplitude noted in the balance position, and then the deviation factor of the alternator signal can be read directly from the calibrated dial associated with the variable potentiometer 14a of voltage divider 14, since the deviation factor of the alternator signal is equal to the percentage of the total output signal which must be impressed on amplifier mixer 12c to provide equal amplitude of the voltages impressed on the oscilloscope 30 with switch 15a in its two positions.

Figs. 3a to 3e, inclusive, show the successive views of the waveforms obtained during various steps in the determination of the deviation factor of a waveform. Fig. 3a shows the original alternator waveform; Figs. 3b and 3c show the residues of the waveform with incomplete amplitude and phase balances, respectively; Fig. 3d shows the waveform residue at complete balance and so at minimum amplitude; and Fig. 3e is the adjusted portion of the bucking voltage set to the same amplitude as in Fig. 3d for use in the deviation factor determination.

Thus, it will be seen that our novel instrumentation provides means for removing the fundamental frequency component of a wave, and impressing the residue of harmonics of the wave upon a cathode-ray oscilloscope. By adjusting the phase and amplitude of the bucking voltage used to remove the fundamental, the harmonic content of the original wave can be made to have some minimum peak amplitude. This peak amplitude can then be compared to the peak amplitude of the bucking voltage, and the ratio of the two amplitudes, or the deviation factor of the original wave, expressed as a percentage, is determined.

The instrument described above operates on 110-volt, 60-cycle power but could be made battery operative with only minor design changes as will be apparent to those skilled in the art. Moreover, the frequency of the alternator voltage being examined is not limited to 60 cycles per second but can be utilized on other frequencies by change in the phase shift and filter networks as will be obvious to those skilled in the art.

Although we have shown and described particular embodiments of our invention, changes may be made in the circuits disclosed without departing from the broader aspects of our invention which we aim to cover in the appended claims.

What we claim as new and desire to secure by Letters Patent of the United States is:

1. An apparatus for determining the deviation factor of an A.-C. voltage comprising in combination means for obtaining the fundamental component of said A. C. voltage, means coupled to said means for obtaining the fundamental component for placing said fundamental component in opposed circuit relationship with said A. C. voltage to obtain the harmonic components of said A. C. voltage, and means coupled to said means for obtaining the harmonic components of said A. C. voltage for quantitatively comparing said harmonic components with said fundamental component.

2. An apparatus as recited in claim 1 wherein the means for obtaining the fundamental component includes filter means connected to a feedback circuit, said filter means being effective to pass the fundamental component to the output terminals and to cause the harmonic components to be fed back into its input in inverted relationship so as to be cancelled out leaving only the fundamental component on said output terminals.

3. A deviation factor meter for determining the deviation factor of the sinusoidal wave form of an alternating current voltage comprising filtering means for filtering out the harmonics present in the alternating current voltage to obtain the fundmental component thereof, means coupled to said filtering means for shifting the phase and adjusting the amplitude of said fundamental component to change the amplitude of said fundamental component to be equal to the amplitude of the fundamental component of the unfiltered voltage and in exactly inverted relationship thereto, means for mixing said adjusted and shifted fundamental component with the unfiltered alternating current voltage and means coupled to said mixing means for quantitatively comparing the voltage amplitude of said harmonic components to the voltage amplitude of said fundamental component.

4. A deviation factor meter for determining the deviation factor of the A. C. output voltage of an alternator comprising a transformer for reducing the amplitude of a signal derived from the alternator, filtering means coupled to said transformer for filtering out the harmonics present in said signal to obtain the fundamental component thereof, a mixer coupled to said filtering means to receive said fundamental component, means for coupling the unfiltered output signal of said transformer to said mixer, means coupled to said filtering means for adjusting the amplitude of said fundamental component to the amplitude of the fundamental component of said unfiltered signal, means for shifting the phase relationship of the fundamental component of said filtering means to a position 180° out of phase with the fundamental component of the unfiltered signal whereby the output of said mixer contains only the harmonic components of said unfiltered signal, and means connected to said mixing means for quantitatively comparing the amplitude of said harmonic components to said fundamental component to obtain the deviation factor.

References Cited in the file of this patent

UNITED STATES PATENTS

| | | |
|---|---|---|
| 2,593,694 | Peterson | Apr. 22, 1952 |
| 2,679,639 | Locker | May 25, 1954 |